United States Patent [19]

Ikeda

[11] 4,160,635

[45] Jul. 10, 1979

[54] APPARATUS FOR PRODUCING WOODEN HEADS OF GOLF CLUBS

[76] Inventor: Yosaku Ikeda, 7229, Fukumitsu-cho, Nishitonami-gun, Toyama-ken, Japan

[21] Appl. No.: 822,832

[22] Filed: Aug. 8, 1977

[30] Foreign Application Priority Data

Aug. 10, 1976 [JP] Japan .................. 51-106682

[51] Int. Cl.² .................. B29C 6/00; B29C 17/00
[52] U.S. Cl. .................. 425/128; 425/395; 425/DIG. 5; 249/66 R; 269/299; 144/327; 425/436 R
[58] Field of Search ......... 425/117, 127, 128, DIG. 5, 425/77, 436, 438, 441; 249/66, 67, 68

[56] References Cited

U.S. PATENT DOCUMENTS

| 1,321,125 | 11/1919 | Pfanstiehl | 425/DIG. 5 |
| 1,609,460 | 12/1926 | Buttles | 425/DIG. 5 |
| 1,838,518 | 12/1931 | Anderson | 425/DIG. 5 |
| 1,855,855 | 4/1932 | Gillis et al. | 425/DIG. 5 |
| 2,156,459 | 5/1939 | Mucher | 425/128 |
| 2,850,766 | 9/1958 | Press et al. | 249/68 X |
| 3,107,395 | 10/1963 | Bundy | 425/77 |
| 3,268,951 | 8/1966 | Newall | 425/DIG. 5 |
| 3,309,741 | 3/1967 | La Point | 249/66 X |

FOREIGN PATENT DOCUMENTS

| 638287 | 2/1928 | France | 425/DIG. 5 |
| 1178560 | 12/1958 | France | 425/DIG. 5 |

Primary Examiner—J. Howard Flint, Jr.
Attorney, Agent, or Firm—Ostrolenk, Faber, Gerb & Soffen

[57] ABSTRACT

An apparatus for producing durable and precise wooden heads of golf clubs, in which method the air in the woody tissue of wooden head materials is firstly removed completely in vacuum, the wooden head materials are then impregnated with a synthetic resin liquid, and they are subjected to compression molding. In the compression molding, the mold pressure is exerted in the direction toward the central portions of the wooden head materials so as to give even and smooth compression effect.

7 Claims, 7 Drawing Figures

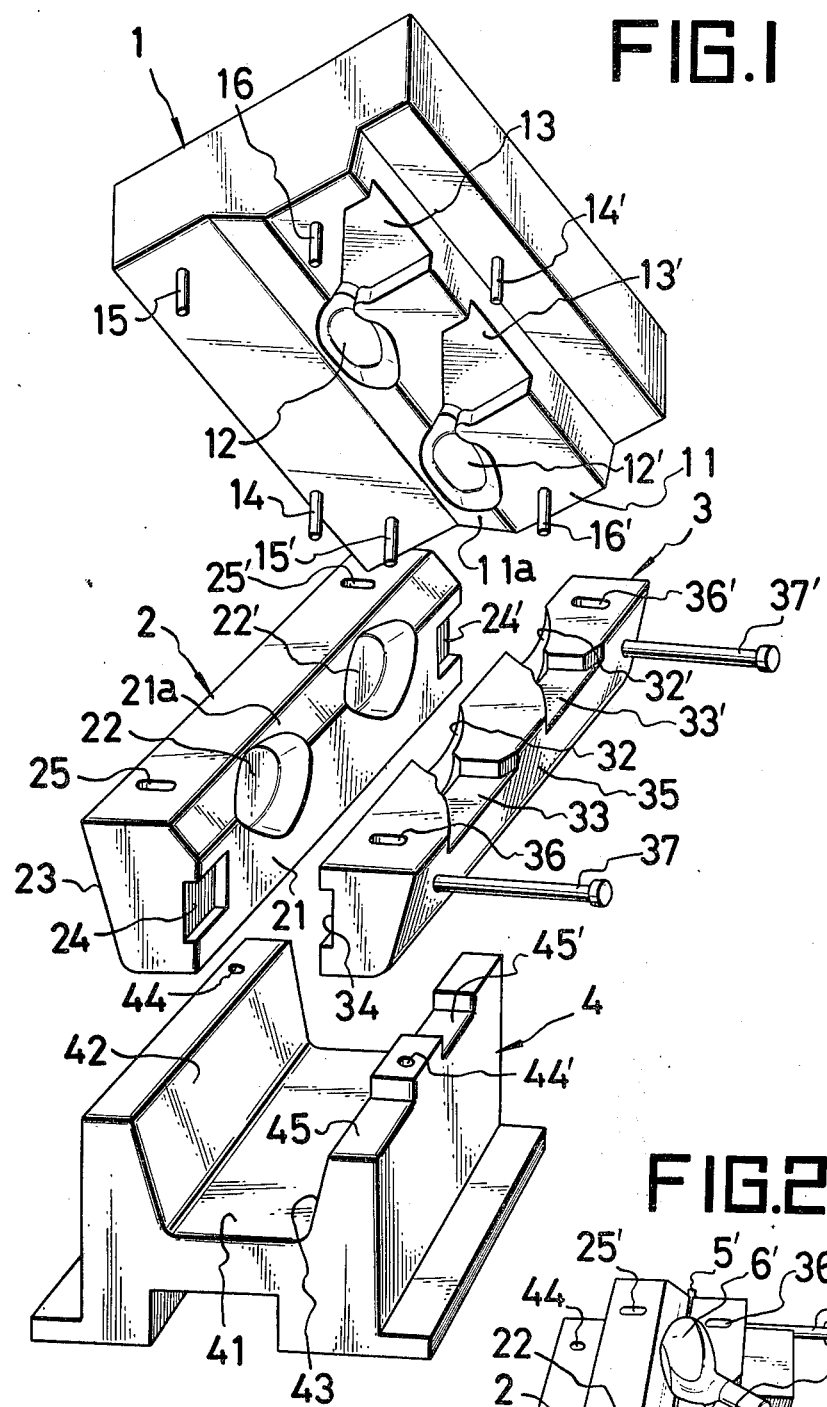
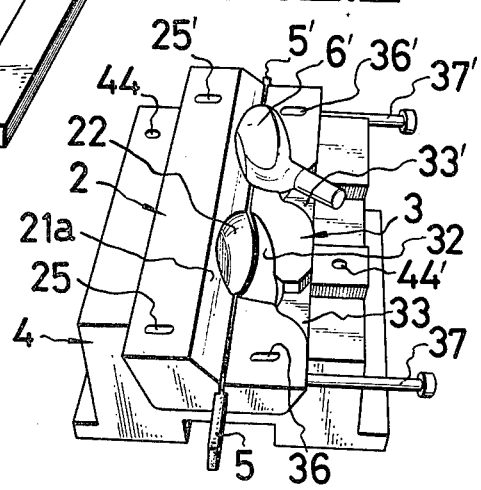

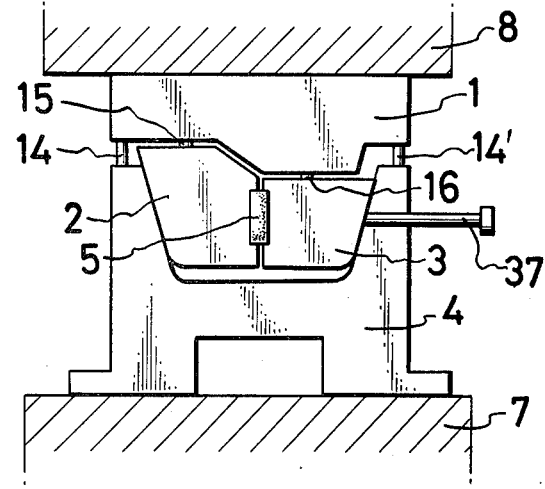
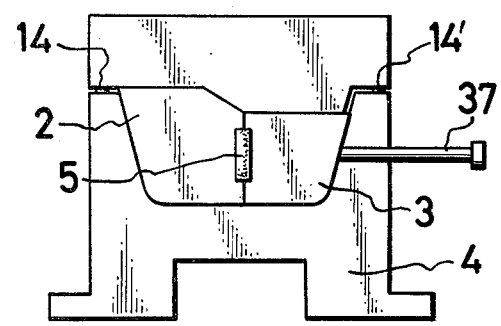
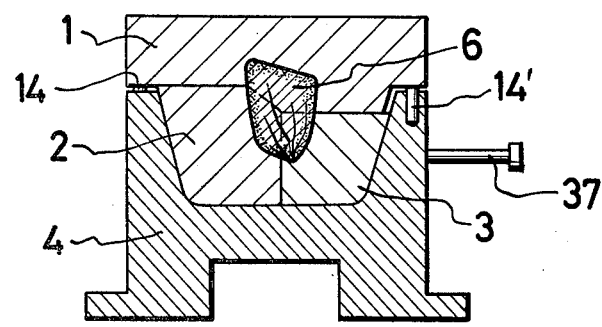

APPARATUS FOR PRODUCING WOODEN HEADS OF GOLF CLUBS

BACKGROUND OF THE INVENTION (1) Field of the Invention

This invention relates to an apparatus for producing the wooden heads of golf clubs. More particularly, the invention relates to a compression molding apparatus for producing the wooden heads which are precise in their dimensions and durable in use.

(2) Description of Prior Art

There are two kinds of golf clubs, that is, wood clubs and iron clubs. Further, it is well known that the wooden heads of wood clubs are produced by employing compression molding method.

As is now done in the manufacture of compressed baseball bats, the compression molding process is employed in order to extend the shooting range. During the process of compression molding of wooden heads, their whole bodies are made somewhat larger than the designed dimensions, the wooden heads are then impregnated with a thermosetting or thermoplastic resin liquid, such as phenol resin or urethane resin, and the resin-impregnated heads are subjected to heat and pressure by compression molding so as to cure the impregnated resin and to compress the wooden heads to the designed dimensions.

In this compression molding, an upper and a lower mold half are generally employed in the conventional method. When only two mold members are used in the compression molding, pressure is applied only in the vertical directions, so that it becomes difficult to eliminate the dimensional errors of wooden head materials and to apply even compression effect to all surfaces of the wooden head materials. In other words, with such upper and lower mold members, the wooden head materials are squeezed vertically and the force to deform radially or horizontally acts on them.

In another conventional method, for example, wooden head materials are impregnated with vinyl monomer and the impregnated resin is cured by applying heat or radiant rays without the application of compression. In such method, the resin-impregnated wooden head materials are swollen and the products are neither dense nor tough. Accordingly, it becomes impossible to hit golf balls to a distance with good hitting sounds.

Furthermore, the wooden head materials are not evacuated before they are supplied with resin liquid in the conventional art so that the wooden head materials cannot be fully impregnated with the resin liquid to their innermost portions even when pressure is applied in the impregnation process, because the air remaining in woody tissue of wooden head materials obstructs the impregnation. The products made from such wooden head materials are liable to suffer from cracking, or deformation owing to absorption of moisture or external impact.

BRIEF SUMMARY OF THE INVENTION

It is, therefore, the primary object of the present invention to provide an improved apparatus for producing the wooden heads of golf clubs which are free from the above-described disadvantages in the conventional art.

Another object of the present invention is to provide an apparatus for producing the wooden heads of golf clubs, in which an improved compression molding technique is employed.

A further object of the present invention is to provide an apparatus for producing the wooden heads of golf clubs, which wooden heads are excellent in quality, precise in dimensions and durable in use.

In the apparatus of the present invention, a process for producing the wooden heads is practiced, which comprises the steps of: placing wooden head materials in a sealed vessel; removing the air in the vessel as well as the air in woody tissue of the wooden head materials; introducing a thermosetting synthetic resin liquid such as phenol resin liquid under pressure into the sealed vessel so as to impregnate the wooden head materials with the resin liquid; taking out the impregnated wooden head materials from the vessel; evaporating the solvent of the synthetic resin liquid; putting the impregnated wooden head materials into the cavities of a compression mold; applying heat and pressure to the mold; leaving the mold to cool; and taking out the wooden head materials from the compression mold.

In another aspect of the present invention, the apparatus is used in a method for producing the wooden heads of golf clubs that comprises the steps of: placing wooden head materials in a sealed vessel; removing the air in the vessel as well as the air in woody tissue of the wooden head materials; introducing a thermoplastic synthetic resin liquid such as urethane resin liquid under pressure into the sealed vessel so as to impregnate the wooden head materials with the resin liquid; taking out the impregnated wooden head materials from the vessel; putting the impregnated wooden head materials into the cavities of a compression mold; applying heat and pressure to the mold; leaving the mold to cool; and taking out the wooden head materials from the mold.

In a further aspect of the present invention, the hitting surfaces of the above wooden head materials obtained from the compression molding have a fiber glass reinforced epoxy resin layer applied to them so as to improve the performance of the wooden heads.

Furthermore, the compression molding apparatus of the present invention includes: an upper mold member and a pair of lower mold members, the upper and lower mold members forming mold cavities for receiving resin-impregnated wooden head materials to be subjected to compression molding; a bed for receiving the lower mold members in its receiving groove, the inclined walls of the receiving groove pressing the lower mold members together by wedge action; an upper hot plate carrying the upper mold member; and a lower hot plate carrying the bed thereon.

BRIEF DESCRIPTION OF THE DRAWINGS

The nature, principle and details of the invention will be more clearly apparent from the following detailed description with respect to preferred embodiments of the invention with the accompanying drawings, in which:

FIG. 1 is a perspective view showing the mold members and the bed that are used for the compression molding of wooden heads according to the present invention;

FIG. 2 is also a perspective view of the state in which lower mold members are fitted to the bed and wooden head materials are set into the mold cavities of the mold members;

FIG. 3 is a front view of the mold members just before the hot pressing step;

FIG. 4 is a front view of the mold members after the hot pressing step;

FIG. 5 is a vertical cross-sectional view of the main portions of the mold members;

DETAILED DESCRIPTION OF THE INVENTION

Figure 6:
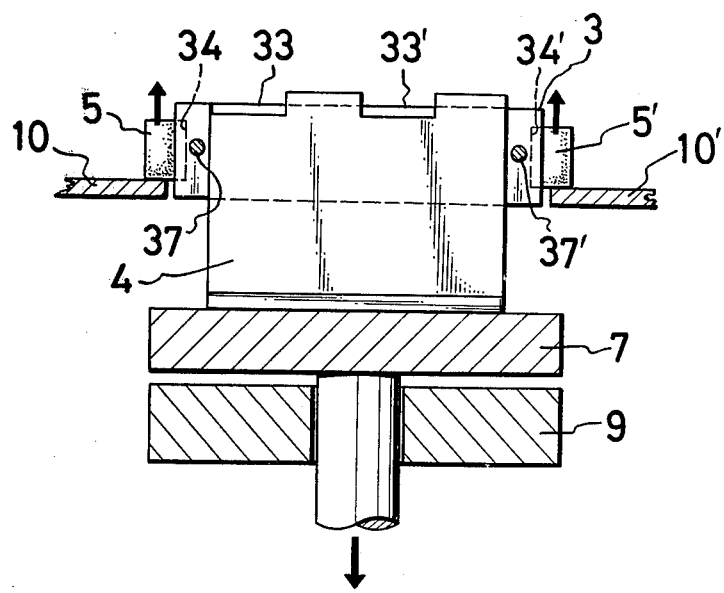
FIG. 6 is a schematic side view showing the state of the mold members as released from the bed after the hot pressing.
Figure 7:
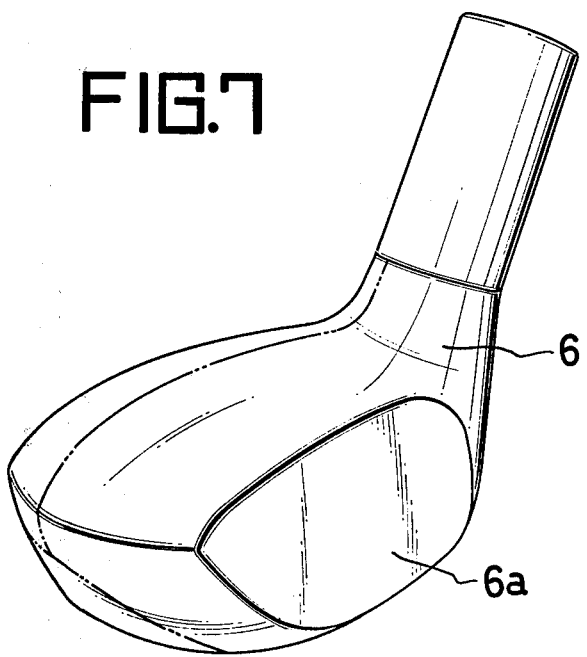
FIG. 7 is a perspective view of a wooden head that is formed with the apparatus of the present invention, in which the imaginary lines indicate the parting lines of mold cavity.

In accordance with the present invention, preshaped wooden head materials made of, for example, persimmon are firstly put into a sealed vessel and the air in the vessel and the fine pores of wooden head materials is drawn by using a vacuum pump. Then, a thermosetting resin liquid such as that of phenol resin is supplied into the vessel under a pressure of about 10 kg/cm$^2$ so as to impregnate the wooden head materials with the resin liquid. The time required for the impregnation at this pressure varies with the kind of wood and when persimmon is used, it may be 5 hours or so.

After this step, the wooden head materials that are impregnated with resin are taken out from the vessel and are left to stand still and are exposed to the air for about 30 days so as to evaporate only the solvent, while the resin remains in the wooden materials.

Thus treated wooden head materials are set in a compression mold and are applied with heat and pressure at about 80° to 90° C. and 200 kg/cm$^2$ for 1 hour. The compression mold is then allowed to cool by stopping the heating while maintaining the pressure for about 5 hours until the temperature of the mold becomes about 30° C. After this spontaneous cooling, wooden heads are taken out of the compression mold. Thus formed wooden heads are quite strong and hard since the woody tissue and the resin are tightly united together.

In another method, preshaped wooden head materials made of, for example, persimmon are put into a sealed vessel and the vessel is then evacuated so as to remove the air in the vessel and in the woody tissue. Then, a thermoplastic resin liquid such as that of urethane resin is supplied into the vessel under a pressure of about 10 kg/cm$^2$ so as to impregnate the wooden head materials with the resin liquid. The time required for this impregnation is about 5 hours.

After this impregnation step, the resin-impregnated wooden head materials are taken out from the vessel and they are at once introduced into a compression mold. In the mold, the resin-impregnated wooden head materials are treated at a temperature of about 60° C. and a pressure of about 200 kg/cm$^2$ for about 1 hour so as to join the impregnated resin and the woody tissue. After this, the resin is hardened by allowing the compression mold to cool and after the cooling, the wooden head materials are taken out from the compression mold. Thus formed wooden heads are quite hard and tough.

In another aspect of the present invention, fiber glass is put on the faces (hitting surfaces) of the above-described wooden heads by using epoxy resin as adhesive. The wooden heads are then introduced into the mold again and are subjected to the treatment at 40° to 50° C. and 200 kg/cm$^2$ for about 30 minutes. With this pressing, cured layers of fiber glass reinforced epoxy resin are formed and tightly bonded to the faces of wooden heads. Thus, the wooden heads of golf clubs having durable hitting faces can be manufactured.

Further, in order to avoid the aforementioned flattening action of the mold, the mold of the present invention comprises at least three mold members which exert pressure in the directions toward the centers of wooden head materials to be compressed. The mold members are formed such that, when they are assembled, a plurality of cavities in the shape of the head of golf club are defined and, in the hot pressing, the wooden head materials in the cavities are compressed toward their centers.

For example, when a spherical body is produced by compression molding, it may be desirably produced by using three or more mold members having spherical cavity surfaces in place of the use of two mold halves. In this case, the more the number of molds becomes, the better the compression molding will be performed. When the compression mold is divided into too many members, however, it becomes difficult to apply force evenly to every mold members. What is worse, many parting lines are formed on the molded products at the boundaries of such mold members. If wooden heads for golf clubs having parting lines or fins are made with such mold members, they may not be accepted by users since the direction of hitting becomes out of order owing to the parting lines. Accordingly, when the mold is divided in the designing of compression mold members, it must be avoided to pass the parting line through the hitting surface of a club head, and it is generally advisable that the compression mold may be divided into 3 to 4 mold members.

Referring now to the accompanying drawings, the present invention will be further described in more detail.

In the drawings, the reference numeral 1 indicates a mold member which is placed over other mold members 2 and 3. The mold 1 is provided with a protruded portion 11 and on one side of the protruded portion 11 is formed an inclined surface 11a. Cavities 12 and 12' having the surfaces to form the hitting surfaces of club heads are formed in both the protruded portion 11 and inclined surface 11a. In the part of protruded portion 11 opposite to the inclined surface 11a, side recesses 13 and 13' are defined, which recesses 13 and 13' communicate with the above-mentioned cavities 12 and 12', respectively. Further, the mold member 1 is provided with locating pins 14 and 14' which are engaged with a bed 4 and other locating pins 15 and 15' which are engaged with another mold member 2. The surface of the protruded portion 11 is provided with other locating pins 16 and 16' which are brought into engagement with the other mold member 3. In the upper part on the inside of the mold member 2, an inclined surface 21a is formed which engages with the inclined surface 11a of the above mold member 1. In the inclined surface 21a and inside wall of the mold member 22, cavities 22 and 22' are formed in side-by-side relationship. The other outer side 23 of mold member 2 is also made oblique. Further, cut grooves 24 and 24' are formed in the angles between the inside wall 21 and the front end surface and the rear end surface. The reference numerals 25 and 25' indicate holes to receive the locating pins 15 and 15' of the mold member 1 and the holes 25 and 25' have their somewhat long openings in the upper surface of the mold member 2. The mold member 3 has an inside wall which has the same area as that of the inside wall 21 of the mold member 2. Between that inside wall and the upper surface of the mold member 3, cavities 32 and 32' are formed side by side and side recesses 33 and 33' are defined in the upper surface of the mold member 3. These side recesses 33 and 33' communicate with the above cavities 32 and 32', respectively. Further, the side recesses 33 and 33' correspond to the other side recesses 13 and 13' that are formed in the protruded portion 11 of the mold member 1. In the inside wall of the mold member 3 are formed cut grooves 34 and 34' which correspond to the cut grooves 24 and 24' that are formed in the mold member 2. Just like the outer side 23 of the mold member 2, the outer side 35 of the mold member 3 is inclined, and further, the outer side 35 is provided with a pair of gripping rods 37 and 37'. In order to receive the locating pins 16 and 16' of the mold member 1, slot-like holes 36 and 36' are defined in the upper surface of the mold member 3. The reference numeral 4 indicates a bed of a roughly U-shaped cross-section having a receiving groove 41. The side walls 42 and 43 are made oblique so as to be fitted to the outer side 23 of the mold member 2 and the outer side 35 of the mold member 3, respectively. In the upper surfaces of side ridges of the bed 4 are formed holes 44 and 44' for receiving the locating pins 14 and 14' of the mold member 1, and depressions 45 and 45' are formed so as to correspond with the side recesses 33 and 33' of the mold member 3.

The mold members 2 and 3 are fitted into the receiving groove 41 of the bed 4 in face-to-face relationship, however, in order to leave some clearance between the bottom surface of the receiving groove 41 and the under surfaces of mold members 2 and 3, and also between the mold members themselves, relatively hard resilient materials 5 and 5' are inserted into the spaces that are defined by the combinations of cut grooves 24 and 34, and cut grooves 24' and 34', respectively. When the mold members 2 and 3 are assembled in such a way, the openings to receive wooden head materials 6' are formed with the cavities 22 and 22' of mold member 2 and the cavities 32 and 32' of mold member 3. The wooden head materials 6' are made somewhat larger than the designed dimensions and previously impregnated with phenol resin liquid as described above. After the wooden head materials 6' are set into the openings formed by the mold members 2 and 3, the mold member 1 is fitted over the mold members 2 and 3 and the bed 4 as shown in FIG. 3. Then, by pressing and heating the mold members, the wooden head materials 6' are compression-molded to the predetermined dimensions and the impregnated phenol resin is simultaneously cured.

This hot pressing is generally performed with a hydraulic press, in which the bed 4 is secured to, for example, a hot plate 7 that is vertically movable and the mold member 1 is secured to the other upper hot plate 8, and they are pressed together by the lift of the lower hot plate 7. In this operation, the wooden head materials 6' are received within the cavities 12 and 12' of the mold member 1 and, when the pressure is increased, the receiving groove 41 of the bed 4 closely hold the mold members 2 and 3, at the same time, pushes them against the mold member 1. That is, the mold members 2 and 3 slide down along the inclined side walls 42 and 43 of the receiving groove 41 of the bed and the inside walls of the mold members 2 and 3 come into contact with each other with compressing the resilient materials 5 and 5'. The mold member 1 also comes into surface contact with the mold members 2 and 3 as shown in FIG. 4. Thus the mold members 1, 2 and 3 are pressed to one another and the wooden head materials 6' are compressed in the direction of their centers by the mold members. With this operation, the dimensions of wooden head materials 6' are slightly reduced to the designed dimensions which are defined by the cavities formed by the mold members 1, 2 and 3, and at the same time, the impreganted phenol resin is cured by the application of heat. While the neck portions of the wooden head materials 6' are held in the openings that are formed by the side recesses 13 and 13' of mold member 1 and the side recesses 33 and 33' of mold member 3, thus they are free from the pressure of the mold members, however, they receive heat from the mold members and the impregnated phenol resin is cured. As described above, the locating holes 25 and 25' of the mold member 2 and other locating holes 36 and 36' of the mold member 3 are made slot-like configuration, the reason for this is that the mold members 2 and 3 can be slid inward to each other when they are held closely into the receiving groove 41 of the mold bed 4.

After the hot pressing, the molded wooden heads 6 are allowed to cool to a desired temperature within the mold members, and then, the hot plate 7 is moved down. The mold members 2 and 3 carrying the wooden heads 6 and the bed 4 are also moved down from the mold member 1. The hot plate 7 is then stopped by a base 9 as shown in FIG. 6, and before the hot plate 7 is received by the base 9, stopper pieces 10 and 10' come into contact with the above-mentioned resilient materials 5 and 5', therefore, the mold members 2 and 3 are released from the bed 4 that is lowered together with the hot plate 7. That is, the mold members 2 and 3 are released from the compressed state and allowed into the state before they are pressed. When the hot plate 7 is stopped by the base 9, the wooden heads 6 are taken out from the mold members 2 and 3, in which they can be quite easily removed since the mold members 2 and 3 are separated from each other by the force of the resilient materials 5 and 5'.

By repeating the above-described operation cycle, the compression molding of wooden heads 6 can be continually performed.

In the apparatus of this invention, when the hot pressing is carried out by using three mold members, the wooden head materials in the cavities of the mold members are simultaneously compressed in the direction toward the centers of them just like that something is clasped by the hand. Therefore, the wooden head materials are evenly compressed and the balances of produced heads are not lost. In addition, the dimensional errors of wooden materials can be completely eliminated without causing any irregular compression. Further, in accordance with the present invention, molded products can be released quite easily from the mold because three or more mold members are employed in place of the conventional two mold halves. With this advantage, therefore, the work efficiency of hot pressing can be much enhanced.

By the way, the mold shown in the drawings comprises three mold members, however, mold members of more than three are of course employed in the method of the present invention. It should be noted, however, that the parting lines between mold members are kept away from the hitting surface of club head when the mold cavity is divided.

In the conventional wooden head producing method with wood-plastics combination system, wood material is impregnated with a synthetic resin such as vinyl monomer and the impregnated material is cured by applying heat or radiant rays. When the wooden head material is not subjected to the treatment with heat and pressure, it becomes large by swelling, and what is worse, the surface of such wooden head is rough and the durability thereof is not satisfactory. So that no agreeable sound is produced when a golf ball is hit with such club and the ball is not shot to a distance.

Further, if the resin impregnation vessel is not evacuated when the wooden head material is impregnated with a resin liquid, the woody tissue cannot be fully impregnated with the resin liquid to their inner parts. Accordingly, if such wood club is used in the rain, the wooden head will deform by swelling after a few days.

Furthermore, when the wooden head material is not held within the mold until the mold is spontaneously cooled after the hot pressing step and if the product is taken out from the mold at 80° to 90° C., the impregnated resin is not sufficiently hardened yet so that the wooden head will swell immediately after it is taken out from the mold since the swelling tendency of wood owing to the application of heat remains yet. As a result, the wooden head becomes the state before the hot pressing and surface cracks are often caused to occur.

In accordance with the present invention, such disadvantages can be eliminated and hard and tough wooden club heads can be always produced.

Although the present invention has been described in connection with preferred examples thereof, many variations and modifications will now become apparent to those skilled in the art. It is preferred, therefore, that the present invention be limited not by the specific disclosure herein, but only by the appended claims.

What is claimed is:

1. A molding apparatus for producing wooden heads of golf clubs including:
   an upper mold member and a pair of lower mold members, said upper mold member and lower mold members forming cavities for receiving resin-impregnated wooden head materials to be subjected to compression molding;
   a bed having a receiving groove for receiving said lower mold members, said receiving groove having inclined inside walls for pressing said lower mold members together by wedge action;
   said lower mold members having facing sides facing toward each other; a protruding member having one portion between said facing sides and having a second portion protruding beyond one end of said facing sides of said lower mold member;
   wherein said protruding member is comprises of relatively hard resilient materials which are interposed between said pair of lower mold members, means formed in at least one of said facing sides for receiving said protruding member therein and this said means and said protruding member being so shaped that upon said lower members being pressed together by said inclined inside walls, said protruding member is compressed and upon said lower mold members being released from being pressed by said inclined walls, said protruding member resiliently urges said lower mold members apart;
   an upper hot plate carrying said upper mold member, and
   a lower hot plate carrying said bed thereon.

2. The molding apparatus for producing wooden heads of golf clubs as claimed in claim 1, wherein at least one of said upper mold member and said lower mold members is divided into at least two mold members.

3. The molding apparatus for producing wooden heads of golf clubs as claimed in claim 1, wherein there are two said protruding members, each projecting beyond a respective end of said lower mold members.

4. The molding apparatus for producing wooden heads of golf clubs as claimed in claim 1, wherein said means comprises a thin width cavity defined in said facing sides for receiving said protruding member one portion; said protruding member one portion having a thickness greater than that of said thin width cavity.

5. The molding apparatus for producing wooden heads of golf clubs as claimed in claim 4, wherein there are two said protruding members and two said cavities; each said cavity being defined in said facing sides and at opposite ends of said lower mold members; each said protruding members projecting beyond a respective said end of said lower mold members from its respective said cavity.

6. The molding apparatus for producing wooden heads of golf clubs as claimed in claim 5, wherein each said cavity is defined by a pair of symmetric grooves facing toward each other and defined in the respective said end of both of said lower mold members.

7. The molding apparatus for producing wooden heads of gold clubs as claimed in claim 6, wherein each said protruding member is in the form of a rectangular plate.

* * * * *